Oct. 2, 1962 A. A. MROS 3,056,315
REDUCTION GEAR DRIVE UNIT
Filed Jan. 6, 1959 2 Sheets-Sheet 1

Albert A. Mros, INVENTOR.

BY *Clarence A. O'Brien*
*and Harvey B. Jacobson*
Attorneys

Albert A. Mros
INVENTOR.

United States Patent Office 3,056,315
Patented Oct. 2, 1962

3,056,315
REDUCTION GEAR DRIVE UNIT
Albert A. Mros, Ravenna, Ohio
(918 N. Columbus Blvd., Tucson, Ariz.)
Filed Jan. 6, 1959, Ser. No. 785,159
9 Claims. (Cl. 74—805)

This invention relates in general to new and useful improvements in reduction gear drive units, and more specifically to a reduction gear drive unit which utilizes a pair of internal planetary gearing assemblies of the eccentric drive type.

It has been known for many years that high reduction ratio drives may be obtained utilizing an internal ring gear and an external mating gear wherein the differential in number of teeth of these gears is relatively small. However, until recently these internal planetary gear assemblies have had little usage primarily because these gears were not suitable for high speed and quiet operation. Further, the methods heretofore employed in making these gears had been such that the tooth form and tooth action in operation have been improper causing a large amount of tooth interference thus eliminating such a reduction gearing assembly for precision work. On the other hand, recently there has been developed a method of cutting the gears of such high reduction internal planetary gearing assemblies so that the use of such gearing has become feasible. This one problem having been solved, there remained a second problem in providing a suitable drive inasmuch as the pinion gear had to be driven eccentrically with respect to the internal gear. Heretofore the drive for such gearing had been limited to pin and slot drives. This, of course, is undesirable where high torques are involved.

It is therefore the primary object of this invention to provide a reduction gear drive unit of the internal planetary gearing type wherein the necessity for a pin and slot drive is eliminated and it is merely necessary to mount the pinion gear eccentrically on the drive shaft and to directly connect the internal gear to the output shaft.

Another object of this invention is to provide an improved reduction drive unit of the internal planetary gearing type wherein there are provided two sets of internal planetary gears, one set of gears having the desired drive ratio and the other set of gears having a zero drive ratio, the other set of gears being utilized solely for the purpose of driving the pinion gear of the one set of gears eccentrically utilizing only a shaft and an eccentric drive member.

A further object of this invention is to provide a reduction gear drive unit which utilizes an internal planetary gearing, the internal planetary gearing being formed of a pinion gear and an internal gear, which gears are machined in a conventional manner but from blanks not intended for the particular gears which are cut so that the teeth of the gears will mate properly and at the same time either a very high reduction drive or a zero drive is possible.

A still further object of this invention is to provide a reduction gear drive unit which includes a housing, an input shaft and an output shaft, the input shaft having secured thereto an eccentric on which there is mounted a pair of pinion gears, the two pinion gears being interconnected, one of the pinion gears being meshed with an internal gear rigidly secured to the housing and thus fixed against rotation and the other of the pinion gears being meshed with an internal gear which is connected to the output shaft, the drive ratio between the one pinion gear and its internal gear being zero and the drive ratio between the other pinion gear and its internal gear being that desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
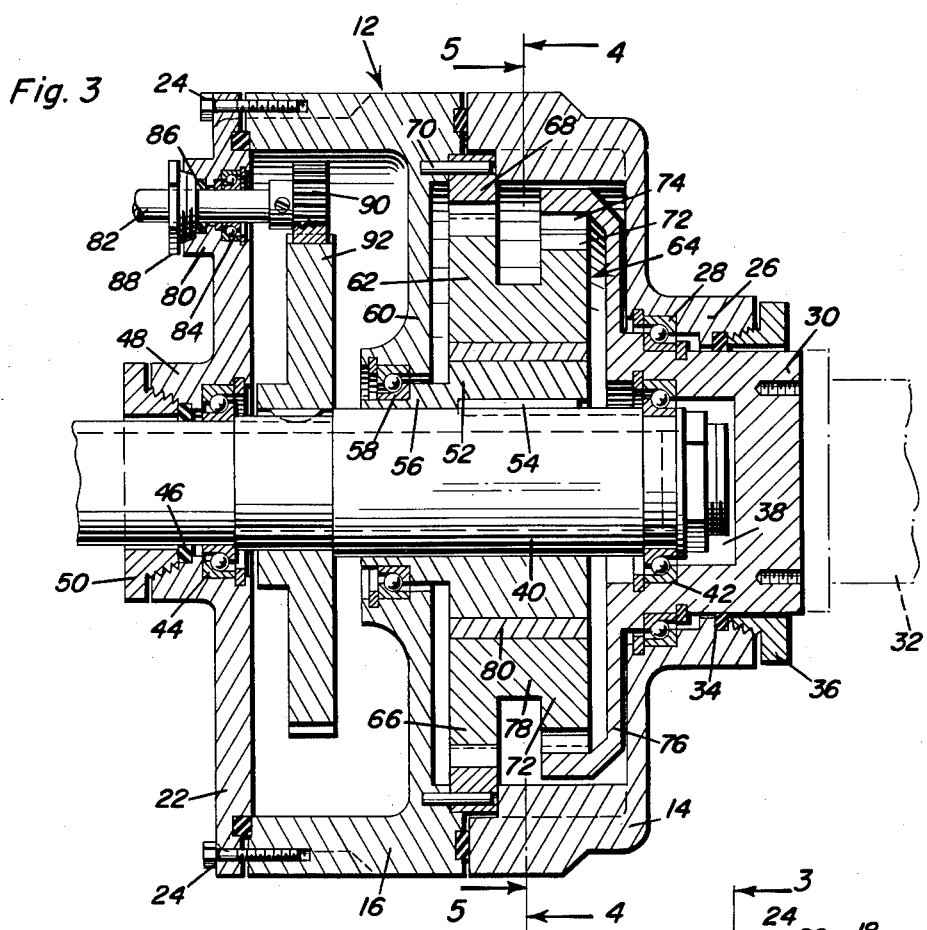
FIGURE 3 is an enlarged vertical sectional view taken substantially upon the plane indicated by the section line 3—3 of FIGURE 2 and shows the specific arrangement of the gears of the drive unit.
Figure 1:
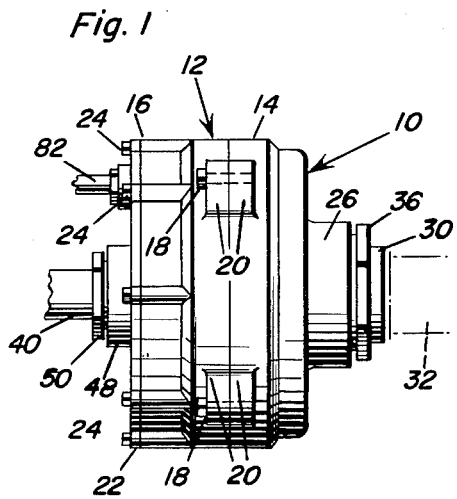
FIGURE 1 is an elevational view of the reduction gear drive unit which is the subject of this invention.
Figure 2:
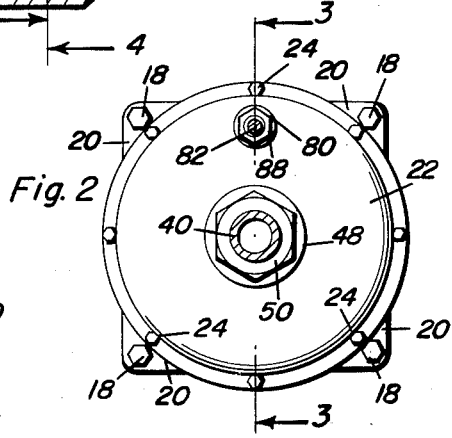
FIGURE 2 is an end view of the reduction gear drive unit as viewed from the left in FIGURE 1.
Figure 4:
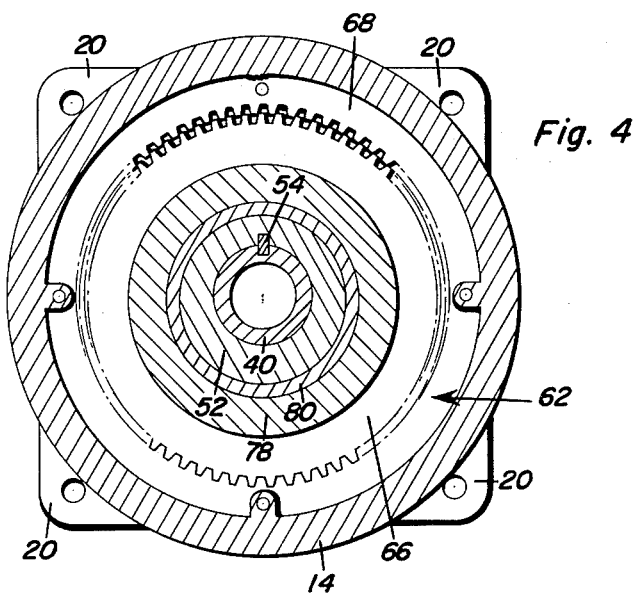
Figure 5:
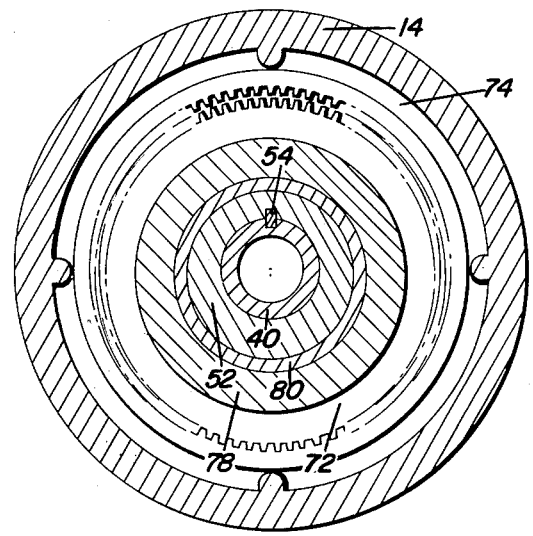

FIGURE 4 is a transverse sectional view taken substantially upon the plane indicated by the section line 4—4 of FIGURE 3 and shows the details of a set of internal planetary gears having a zero drive ratio; and FIGURE 5 is a transverse sectional view taken substantially upon the plane indicated by the section line 5—5 of FIGURE 3 and shows the details of the set of internal planetary gears having the gear reduction drive.

Referring now to the drawings in detail, it will be seen that there is illustrated the reduction gear drive unit which is the subject of this invention, the reduction gear drive unit being referred to in general by the reference numeral 10. The drive unit 10 includes a housing which is referred to in general by the reference numeral 12. The housing 12 is formed primarily of two halves 14 and 16 which are coupled together by a plurality of fasteners 18 which extend through ears projecting from the halves 14 and 16 at spaced intervals, the ears being referred to by the reference numeral 20. The housing half 16 is also provided with an end plate 22 which is secured in place by means of fasteners 24. At this time it is pointed out that the construction of the housing 12 is not a critical feature of the invention, the housing 12 being only for the supporting of the gears of the drive unit 10.

As is best shown in FIGURE 3, the housing half 14 includes a reduced sleeve portion 26 on which there is positioned a bearing 28. Rotatably journaled in the bearing 28 is a stub output shaft 30 to which a shaft, such as the shaft 32 may be connected. The output shaft 30 is sealed with respect to the housing 12 by means of a sealing ring 34 which is held in place by a packing nut 36 threadedly engaged in the end of the sleeve portion 26.

The inner end of the output shaft 30 has a recess 38 formed therein. Projecting into the recess 38 is one end of an input shaft 40. The input shaft 40 is supported with respect to the output shaft 30 by means of a bearing 42. The input shaft 40 is also supported with respect to the housing 12 by means of a bearing 44 carried by the end plate 22. Further, the input shaft 40 is sealed with respect to the housing 12 by means of a sealing ring 46 which is carried by a sleeve portion 48 of the end plate 22 and which is held in place by means of a packing nut 50.

Mounted on the input shaft 40 for rotation therewith is an eccentric drive member 52. The eccentric drive member 52 is secured to the input shaft 40 by means of a key 54. The eccentric drive member 52 has a hub portion 56 which is supported by means of a bearing 58 carried by a web 60 which is part of the housing half 16.

The drive unit 10 includes two internal planetary gear assemblies which are referred to in general by the reference numerals 62 and 64. The internal planetary gear assembly 62 includes a pinion gear 66 and an internal gear 68. The internal gear 68 is clamped between the housing valves 14 and 16 and is secured to the housing half 16 against rotation by means of a plurality of circumferentially spaced pins 70.

The internal planetary gear assembly 64 also includes a pinion gear 72 and an internal gear 74. The internal gear 74 is, however, connected to the output shaft 30 by means of a connecting flange 76.

As illustrated, the pinion gears 66 and 72 are connected together by an integral hub 78. However, the two pinion gears 66 and 72 may be separately formed and otherwise secured together. It is, however, necessary that the two pinion gears 66 and 72 be rigidly locked together for gyration in unison. The hub 78 is mounted on the eccentric drive member 52 by means of a sleeve-type bearing 80.

Referring now to FIGURE 4 in particular, it will be seen that the internal gear 68 is only slightly bigger than the pinion gear 66. Furthermore, while there is clearance within the internal gear 68 for the eccentric movement of the pinion gear 66, inasmuch as the pinion gear 66 will be provided with the same number of teeth as the internal gear 68, even though the pinion gear 66 is driven eccentrically by means of the eccentric drive member 52, the internal gear 68 may remain fixed to the housing 12. Thus, the sole function of the internal planetary gear assembly 62 is to assure the eccentric driving of the pinion gear 72 through the interconnection of the pinion gear 72 with the pinion gear 66.

The internal planetary gear assembly 64 is of the same general construction as the internal planetary gear assembly 62. However, while the internal gear 74 is only slightly larger than the pinion gear 72, and the pinion gear 72 is mounted for eccentric movement, there are a lesser number of teeth on the pinion gear 72 so that a reduction drive of a very low ratio is obtainable.

Referring once again to FIGURE 3 in particular, it will be seen that the cover plate 22 includes an offset sleeve portion 80 through which there passes a drive shaft 82. The drive shaft 82 is rotatably journaled in a bearing 84 carried by the cover plate 22 and is sealed with respect to the cover plate 22 by means of a sealing ring 86 held in place by a packing nut 88. The drive shaft 82 terminates within the housing 12 in a drive gear 90 which is meshed with a driven gear 92 carried by the input shaft 40. At this time it is pointed out that this is only one of the many drives which may be provided for the input shaft 40. There is no reason why the input shaft 40 may not be directly coupled to a power source if it is so desired.

Although the planetary gear assemblies 62 and 66 will function with great friction losses for a short period of time utilizing previously known types of gears, it is also desirable that the pinion gears 66 and 72 and the internal gears 68 and 74 be specially formed. Each of these gears has been formed utilizing a conventional type of gear cutter in the customary manner, but utilizing a blank which is larger than the blank normally used in cutting a gear with the desired number of teeth. The gears may be formed either by machines which utilize gear shaper cutters which are rotated during the tooth cutting operation or by a reciprocating shaper.

In the formation of one of the gears 66, 72, 68 and 74, given the number of teeth, the tooth form and the pitch, the diameter of blank required for the cutting of the desired tooth form may be readily determined. Utilizing an automatic gear cutting machine of the conventional type, once the particular gear to be cut is determined, it is merely necessary to place the proper shape of cutter in the gear cutting machine, index the machine and then place the proper blank in the machine after which the machine is started and the gear automatically cut after the cutter is initially fed into the blank to the proper depth.

Inasmuch as the gear blank is rotated to a certain angle between each cut depending upon the tooth formed, it will be seen that if a larger diameter blank is placed in the gear cutting machine, because of the increase in radial distances, while the same blank may be rotated to the same angle as a small blank, the periphery of the blank will rotate a greater distance. It is upon this principle that the method of cutting gears utilized in forming the gears of this invention is based.

In determining the proper size of gear blank to be used in the formation of the pinion gears 66 and the internal gear 68 the size of the blank, as expressed in the number of teeth, is derived from the formula $$T_I + \frac{(C-x)}{2} + 1$$

for the internal gears and from the formula $$T_P + \frac{(C-x)}{2} - 1$$

for the pinion gears wherein T is the number of teeth on the gear being formed, $x$ is the differential in number of teeth between a mating internal gear and a pinion gear, and C is a constant for a particular tooth design. The constant C is the preferably recommended minimum differential in number of teeth between mating internal ring gear and pinion. It is generally recognized that the smallest permissible differential between the number of teeth in pinion and internal gears, to give proper tooth action without considerable modification of the tooth shape, is 8 teeth for 20° stub tooth form, 10 teeth for 20° full length tooth form, and 12 teeth for 14½° full length involute tooth form.

The previously mentioned formula applies only to the blanks utilized in the formation of the pinion gear 66 and the internal gear 68, which gears have a zero drive ratio. In determining the proper size of gear blank to be used in the formation of the pinion gear 72 and the internal gear 74, a slightly different formula is used. When the tooth differential between the pinion gear 72 and the internal gear 74 is one, the size of the blank, as expressed in the number of teeth, is derived from the formula $$T_I + \frac{(C-x)}{2} + .5$$

for the internal gears and from the formula $$T_P + \frac{(C-x)}{2} - .5$$

for the pinion gears. On the other hand, when the tooth differential between the pinion gear and the internal gear is two teeth or more, the formula for determining the size of the blank for both the pinion gear and the internal gear is $$T + \frac{(C-x)}{2}$$

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A reduction gear drive unit comprising an input shaft and an output shaft, first and second pinion gears, means mounting said first and second pinion gears on said input shaft for eccentric movement, and first and second internal gears meshed with said first and second pinion gears, respectively, means securing said first and second pinion gears together for gyration together, means secured to said first internal gear to prevent rotation of said first internal gear, and means connecting said output shaft to said second internal gear, the drive ratio between said first pinion gear and said first internal gear being zero.

2. A reduction gear drive unit comprising an input shaft and an output shaft, first and second external gears, means mounting said first and second external gears on said input shaft for eccentric movement, and first and second internal gears meshed with said first and second external gears, respectively, means securing said first and second external gears together for gyration together, means secured to said first internal gear to prevent rotation of said first internal gear, and means connecting said output shaft to said second internal gear, each gear having a proportionately larger blank diameter than the blank diameter used for the same number of teeth of conventional size on the respective gears, the increase in diameter being greater for each smaller tooth differential, but being equal in the meshed internal and external gears.

3. The reduction gear drive unit of claim 2 wherein the size of the gear blanks for each stage of reduction is determined by the formula $$T_b = T_{I\ or\ E} + \frac{(C-X)}{2}$$

expressed in the number of teeth wherein $T_b$ is the size of the new gear blank expressed in the number of teeth; T is the number of teeth desired to be cut in the new gear blank ($T_I$=internal gear, $T_E$=external gear); C is the constant for the minimum tooth differential for mating internal and external gears which may be cut by conventional means without impairment of the involute form of the teeth, their assembly or action in operation; X is the desired tooth differential between mating internal and external gears to and including two teeth.

4. In the process of forming a reduction gear unit having at least one set of mating internal gear and pinion gear, each gear having a predetermined number of teeth formed thereon, the steps of obtaining a gear blank of a size, as expressed in number of teeth, in excess of the size blank normally required for a gear having the predetermined number of teeth, and forming a gear having the predetermined number of teeth therein from the excess sized gear blank.

5. A process for forming an internal planetary involute gear set for high reduction ratio drives with conventional gear machines, cutters and procedures in setting up and cutting and requiring no special modifications to machine or cutter comprising the steps of obtaining the blanks for the internal gear and mating pinion gear, with each blank being a predetermined amount larger, expressed in the number of teeth, for conventional calculation of gear diameter, the excess number of teeth in the internal gear and the mating pinion gear being the same thereby accounting for the increased diameter of the blanks, and forming the teeth on the gears with conventional gear forming machines.

6. The process of claim 5 including the steps of calculating the excess number of teeth for the blanks by employing the formula $$\frac{(C-x)}{2}$$

where C is a particular conventional minimum tooth design differential recommended between internal and pinion mating gears, $x$ is the desired differential in the number of teeth between said internal gear and mating pinion gear less than the conventional differential C, and the difference between C and $x$ divided by 2 being the amount of increase of each blank diameter expressed in number of teeth.

7. A mating internal and external gear with the external gear being disposed eccentric in relation to the internal gear, each of said gears having a predetermined number of teeth with the diffeerntial in the number of teeth being below the minimum conventional differential recommended for internal and external mating gears, each gear having a blank diameter in excess of the blank diameter required for the number of teeth on the respective gears, the excess diameter being equal in the internal gear and the external gear.

8. A mating internal and external gear with the external gear being disposed eccentric in relation to the internal gear, each of said gears having a predetermined number of teeth and a predetermined differential in the number of teeth from the minimum tooth differential possible by conventional means without tooth modification, each gear having a blank diameter in excess of the blank diameter required for the number of teeth on the respective gears, the excess diameter being equal in the internal gear and the external gear.

9. The method of making an internal planetary involute gear set for high reduction ratio drives by employing conventional gear machines, cutters and procedures in setting up and cutting and requiring no special modifications to a machine or cutter, said method comprising the steps of obtaining gear blanks of a size, expressed in number of gear teeth, in excess of the size blank normally required for producing a gear having the number of teeth to be formed in each gear of the set, the excess in size of each gear in the set being equal, and forming unmodified teeth on the gear blanks with conventional gear forming machines while using conventional procedures.

References Cited in the file of this patent

UNITED STATES PATENTS

| | | |
|---|---|---|
| 886,938 | Brush | May 5, 1908 |
| 2,250,259 | Foote | July 22, 1941 |
| 2,881,619 | Fox | Apr. 14, 1959 |